2,891,044
PROCESS FOR POLYMERIZATION OF ETHYLENE

Albert S. Matlack, Wilmington, Del., assignor to Hercules Powder Company, Wilmington, Del., a corporation of Delaware No Drawing. Application May 27, 1957
Serial No. 661,570

9 Claims. (Cl. 260—94.9)

This invention relates to the polymerization of ethylene under relatively mild conditions of pressure and temperature and, more particularly, to an entirely new type of catalyst system for the polymerization of ethylene.

K. Ziegler has described the polymerization of ethylene with organometallic compounds of the metals of group III–A of the periodic table, i.e., organometallic compounds of aluminum, gallium and indium to produce polymers varying in molecular weight from dimers up to the wax range polymers. He has also described the preparation of high molecular weight crystalline polymers by contacting ethylene with a mixture of one of these organometallic compounds of aluminum, gallium or indium, etc., with a compound of a metal of group IV–B, V–B, VI–B or VIII of the periodic table.

Now in accordance with this invention it has most unexpectedly been found that ethylene may be polymerized to a high molecular weight, crystalline polymer at relatively mild temperatures and pressures by contacting ethylene with a hydride of one of the metals of the subgroups of groups IV, V and VII, i.e., the group IV–B, V–B and VII–B metals which include titanium, zirconium, hafnium, vanadium, niobium, tantalum, manganese, etc. Just how one of these transition metal hydrides can catalyze the polymerization of ethylene is not known. The fact remains that they are very active catalysts and yield a highly crystalline polyethylene that is particularly outstanding in that it is a much more highly saturated polymer than is obtained by the prior art low pressure processes.

The metal hydride that is used as the catalyst in accordance with this invention may be preformed or formed in situ by the reaction of the metal with hydrogen. The latter method is obviously the preferred method in the case of an unstable metal hydride such as vanadium hydride but is equally operable in the case of the metals that form stable hydrides. In such cases the metal, as for example, vanadium, and hydrogen are reacted in the presence of ethylene, as for example, by milling or any other means of exposing an active metal surface to the action of hydrogen whereby there is formed, at least on the surface of the metal, the hydride which then catalyzes the polymerization reaction. That there is hydride formation when the metal and hydrogen are reacted in the presence of ethylene is dramatically demonstrated in the case of titanium. The metal alone when ball milled with ethylene gave no polymer, whereas when the titanium metal and hydrogen were ball milled with ethylene under the same conditions, crystalline polyethylene was produced. When a preformed metal hydride is used, it preferably is in a finely divided state or is reduced to such a state while in contact with the ethylene. Thus, for example, titanium hydride will be added to the polymerization system as a finely divided solid such as is obtained by ball milling, or the polymerization may be carried out in a ball mill while the hydride is milled. The process may be carried out as a batchwise or continuous operation.

As will be apparent from the above discussion, any amount of the group IV–B, V–B or VII–B metal hydride may be used for the polymerization from a minor catalytic amount, as for example, the small amount that is present on the surface of vanadium when vanadium and hydrogen are milled together, up to a large excess. In the case of a preformed metal hydride, the amount added will generally be from about 0.1% to about 50% and preferably from about 1% to about 20%, based on the ethylene.

The polymerization of ethylene in accordance with this invention may be carried out in a wide variety of ways. It may be carried out in the presence or absence of an inert organic diluent as reaction medium. Generally, a diluent is used because it simplifies the isolation of the polymer at the end of the polymerization reaction. Any inert liquid organic diluent may be used, as for example, aliphatic hydrocarbons such as hexane, heptane, etc., cycloaliphatic hydrocarbons such as cyclohexane or aromatic hydrocarbons such as benzene, toluene, xylene, etc., or any mixture of such hydrocarbons, halogenated hydrocarbons such as methylene chloride, ethylene chloride, chloroform, carbon tetrachloride, chlorobenzene, etc.

The temperature and pressure used for the polymerization process may be varied over a wide range and will largely depend upon the method by which the ethylene is contacted with the metal hydride. In general, the polymerization will be carried out at room temperature or slightly above, but any temperature within the range of from about −80° C. to about 200° C. may be used, preferably from about 0° C. to about 100° C., and more preferably from about 20° C. to about 60° C. In the same way, while atmospheric pressure or a pressure of only a few pounds may be used, the polymerization may be carried out over a wide range of pressures, but higher pressures do not appreciably alter the course of polymerization and, hence, are not required. In general, it is desirable to operate under anhydrous and anaerobic conditions.

While, as will be seen from the examples, the metal hydrides are excellent catalysts for the polymerization of ethylene, it may be desirable in some instances to add a cocatalyst or activator to the polymerization system whereby the rate of polymerization and/or yield may be increased. Exemplary of such cocatalysts or activators that may be added are the halogens such as iodine, bromine, etc., the hydrogen halides, such as hydrogen chloride, hydrogen bromide, etc., and the halides of the metals themselves. Obviously many other variations may be made in the process without departing from the scope of this invention.

The following examples will demonstrate the process of polymerizing ethylene in accordance with this invention. The molecular weight of the polymers produced in these examples is indicated by the reduced specific viscosity (RSV) given for each. By the term "reduced specific viscosity" is meant the $\eta_{sp}/c$ determined on an 0.1% solution of the polymer in decalin, containing 0.1 g. of the polymer per 100 ml. of solution (unless otherwise indicated), at 135° C. Where the melting point of the polymer is given, it is the temperature at which the birefringence due to crystallinity disappears. All parts and percentages are by weight unless otherwise indicated.

Examples 1–7

In these examples the polymerization was carried out in cylindical vibratory ball mills which were constructed of stainless steel (analysis: carbon—0.008% max.; Cr— 18.00–20.00%; Ni—8.80–10.00%; Mn—2.00% max.) and outfitted with a gas inlet tube and a main opening. The mills were 80% full of 0.5 inch stainless steel balls.

In each case the mill, previously dried for 4 hours at 120° C., was charged with 70 parts of n-heptane which had been dried over sodium. To the mills in Examples 1–4 there was added 2.0 parts of titanium hydride, zirconium hydride, niobium hydride and tantalum hydride, respectively. In Examples 5-7 the metal hydride was formed in situ by adding 2.0 parts of titanium metal powder, vanadium metal granules and manganese metal, respectively, and hydrogen as described below. The mill in each case was then capped, twice filled with dry nitrogen and evacuated, and then ethylene was injected to a pressure of 50 p.s.i.g. in Examples 1-4, and 40 p.s.i.g. in Examples 5-7, 10 p.s.i.g. of hydrogen also being added to Examples 5-7. After 16 hours of milling at room temperature, the polymer slurry was removed from the mill and the polyethylene was isolated by filtration. The polymer so obtained was purified by leaching with a 50:50 mixture of n-butanol and 48% hydrofluoric acid for 16 hours at room temperature, again separating the polymer by filtration and washing it free of acid with water and ethanol and then drying for 16 hours at 80° C. under vacuum. The metal hydride used and the final pressure in each case is set forth below along with the yield, RSV and melting point of the polymer obtained in each case.

| Example | Catalyst Added | Final Pressure, p.s.i.g. | Percent Conversion | RSV | Melting Point, °C. |
|---|---|---|---|---|---|
| 1 | Titanium hydride | 0 | 40 | 0.4 | 128 |
| 2 | Zirconium hydride | 9 | 63 | 4.2 | 136 |
| 3 | Niobium hydride | 3 | 73 | 3.2 | 131 |
| 4 | Tantalum hydride | 8 | 67 | 3.2 | 130 |
| 5 | Titanium hydride formed in situ | 5 | 31 | 39.0 | 135 |
| 6 | Vanadium hydride formed in situ | 6 | 86 | 4.0 | 131 |
| 7 | Manganese hydride formed in situ | 24 | 22 | (1) | 132 |

1 Too insoluble in decalin to measure.

*Example 8*

A polymerization vessel in which the air had been removed was charged with 35 parts of heptane and 0.25 part of a previously ball-milled titanium hydride. The vessel and contents were equilibrated at 30° C. and 2 parts of ethylene was added. After 23 hours at 30° C., the polymer slurry was removed and the polyethylene was separated by filtration. The polymer was purified by heating it with a 5:5:1 n-butanol:toluene:concentrated hydrochloric acid mixture at reflux for 2 hours. The polymer was again separated by filtration, washed acid free with methanol and dried for 3 hours at 70° C. The polyethylene so obtained had a melting point of 136° C.

The many advantages of the process of this invention will be at once apparent to those skilled in the art. It is a halogen-free catalyst system, hence the problem of mold corrosion encountered on molding the polymer is eliminated. The use of the hazardous, spontaneously inflammable, aluminum alkyls, used in the prior art processes, is avoided. Other advantage lies in the better control that may be had in a one-component catalyst system, less equipment required, less need for blanketing operations with inert gases, etc.

The periodic chart used in this specification and appended claims for designating the groups and subgroups of the periodic table is that given in the "Handbook of Chemistry and Physics," published by Chemical Rubber Publishing Company, Cleveland, Ohio, on pages 392-3 of the 36th edition. Thus, the metals designated as group IV-B, V-B, and VII-B are those that occur in the left-hand side of groups IV, V and VII in the Mendeleev form of the periodic table (see Deming, "General Chemistry," sixth edition, 1952, John Wiley & Sons, Inc., New York).

What I claim and desire to protect by Letters Patent is:

1. The process of polymerizing ethylene which comprises contacting ethylene with, as the sole polymerization catalyst, a metal hydride selected from the group consisting of the group IV-B, V-B and VII-B metal hydrides, said group IV-B, V-B, and VII-B metals being those on the left-hand side of groups IV, V and VII, respectively, of the Mendeleev form of the periodic table.

2. The process of claim 1 wherein the metal hydride is formed in situ by contacting hydrogen with an active metal surface, said metal being a metal selected from the group consisting of the group IV-B, V-B and VII-B metals and having an active surface exposed to the hydrogen, said group IV-B, V-B, and VII-B metals being those on the left-hand side of groups IV, V and VII, respectively, of the Mendeleev form of the periodic table.

3. The process of claim 1 wherein the metal hydride is a group IV-B metal hydride.

4. The process of claim 1 wherein the metal hydride is a group V-B metal hydride.

5. The process of claim 1 wherein the metal hydride is a group VII-B metal hydride.

6. The process of claim 3 wherein the metal hydride is titanium hydride.

7. The process of claim 3 wherein the metal hydride is zirconium hydride.

8. The process of claim 4 wherein the metal hydride is tantalum hydride.

9. The process of claim 2 wherein the metal hydride is formed in situ by the reaction of hydrogen with vanadium.

References Cited in the file of this patent
UNITED STATES PATENTS
2,721,189   Anderson et al. _____ Oct. 18, 1955